June 14, 1966   R. L. WEIHER ET AL   3,255,665
ARTICLE OF MANUFACTURE FOR CONTROLLING LIGHT TRANSMITTANCE
Filed May 21, 1964   2 Sheets-Sheet 1

INVENTORS
RICHARD L. WEIHER
WILLIAM C. TAIT
BY
Carpenter, Abbott, Coulter & Kinney
ATTORNEYS

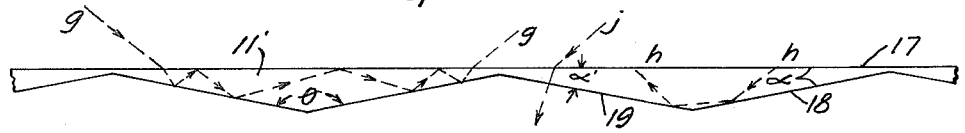
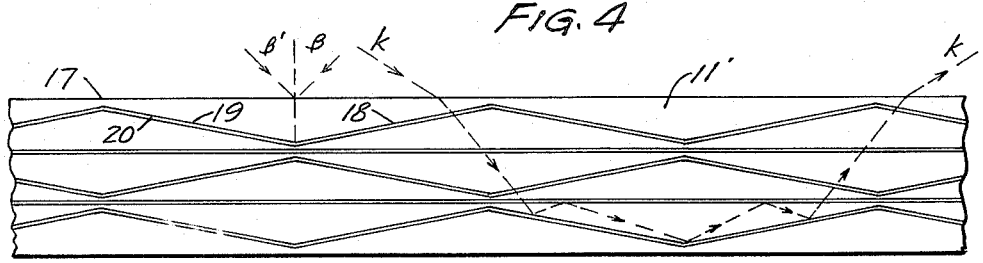
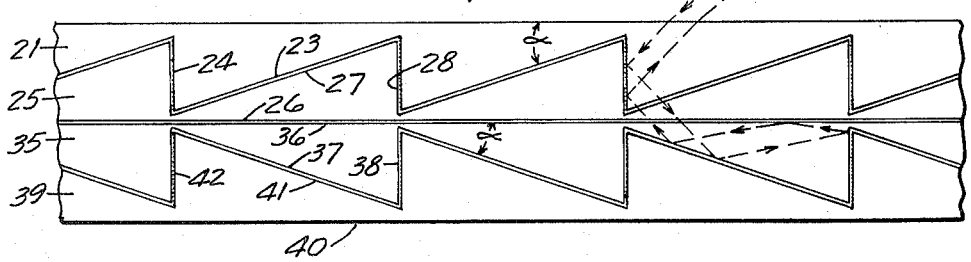
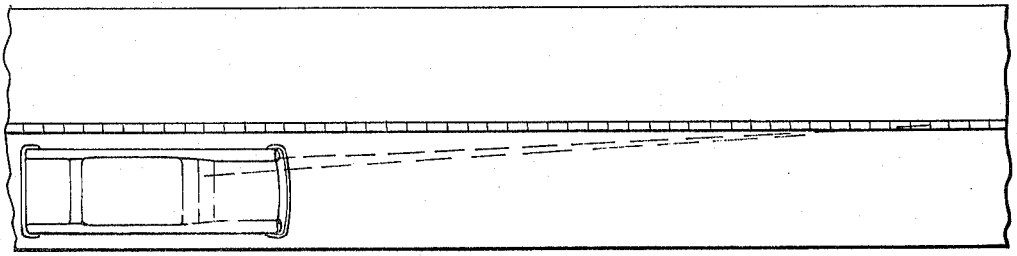
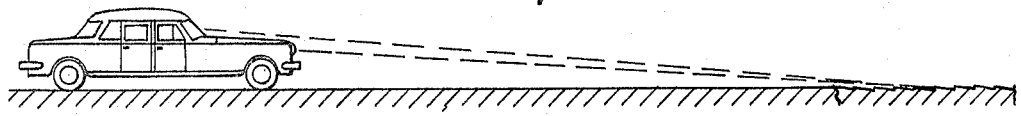
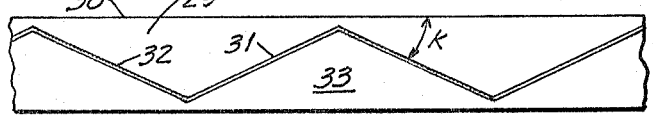

United States Patent Office 3,255,665
Patented June 14, 1966

3,255,665
ARTICLE OF MANUFACTURE FOR CONTROLLING LIGHT TRANSMITTANCE
Richard L. Weiher, Hudson, Wis., and William C. Tait, Stillwater, Minn., assignors to Minnesota Mining and Manufacturing Company, St. Paul, Minn., a corporation of Delaware
Filed May 21, 1964, Ser. No. 369,152
10 Claims. (Cl. 88—60)

This invention relates to a sheet material that controls the transmission of light rays that strike the surface thereof.

The present invention utilizes the principles of prismatic reflection and refraction of light rays. It is well known that when a light ray traveling in a first medium strikes the interface between the first medium and a second medium at any angle other than the normal, it will change direction upon entering the second medium. The change of direction is dependent on the relative index of refraction between the two media. Thus, if the first medium has a higher index of refraction than the second medium, the change will be to increase the angle to the normal, and if the first medium has a lower index of refraction than the second medium, the change will be to decrease the angle to the normal.

The angle of the ray to the normal after the ray has entered the second medium is referred to as the angle of refraction, and the angle of the ray to the normal in the first medium is referred to as the angle of incidence. Thus, if the angle of incidence is known and the index of refraction of the two media is known, the angle of refraction can easily be calculated by the following formula:

$$\text{sine (angle of refraction)} = \frac{\text{index of refraction of 1st medium}}{\text{index of refraction of 2nd medium}} \times \text{sine (angle of incidence)}$$

In the case where light travels from the medium having the higher index of refraction into the medium having the lower index of refraction, the angle of refraction is greater than the angle of incidence. It follows in such cases that the angle of refraction will approach ninety degrees when the angle of incidence is considerably less than ninety degrees. It follows that if the angle of incidence is increased beyond that point (i.e., where the index of refraction equals 90°), the light rays cannot pass into the second medium and will be reflected from the interface back into the first medium. The angle of incidence, whereby the angle of refraction is exactly equal to 90°, is referred to as the critical angle of incidence and can be calculated as follows:

$$\text{sine (critical angle of incidence)} = \frac{\text{index of refraction of 2nd medium}}{\text{index of refraction of 1st medium}}$$

The above principles are adopted in the present invention by designing a multi-layered sheet material having one layer constructed of light transmitting substance with one side thereof comprising a flat surface and the other side a series of alternating first and second prism faces. Said first prism faces are disposed at an angle to the flat surface so that certain light rays that strike said sheet material on the side adjacent said flat surface beyond a predetermined angle, will be refracted into said layer and be directed toward the first prism faces at an incident angle greater than the critical angle of incidence. These rays are reflected by said first prism faces, and it is important to note that the direction of such rays is always away from the apex of the angle between the flat surface and the first prism faces. Thus, the rays that are reflected by the first prism faces and directed back toward said flat surface have an angle of incidence with said flat surface greater than the angle of incidence said ray previously had with the first prism faces. The interface at the flat surface will therefore also reflect the ray which if redirected back toward the first prism faces will have a still further increased angle of incidence with said first prism faces. The rays are thus trapped within the plate until they strike a third side of the layer such as the herein second prism faces. It is therefore seen that the final disposition of the rays is dependent on the construction of said third side.

It is an object of the present invention to prevent all of the rays that strike the sheet beyond the mentioned predetermined angle from passing through the sheet. This has been accomplished heretofore in certain window constructions by providing the mentioned third side with a light absorbing coating. Thus, the mentioned light rays are reflected back and forth between the flat surface and the first prism faces until they strike the third side, where they are then absorbed by the coating. This prevents the passing of said rays through the window; however, it also causes the window to heat up. In that such windows are normally adapted for summer use, this feature is objectionable and thus the prior art construction is believed unsatisfactory. It is therefore a further object of the present invention to provide the second prism faces with means whereby the light rays are caused to escape the sheet, but only through the side from which they originally entered.

The invention and its uses and advantages are further described and explained in the following detailed description and drawings in which:

FIG. 3 is an edge view of a portion of a layer of a sheet material incorporating a second form of the invention.

FIG. 4 is an edge view of a portion of a sheet material incorporating the form of the invention illustrated in FIG. 3.

FIG. 5 is an edge view of a portion of a sheet material incorporating a third form of the invention.

FIG. 6 is an edge view of a portion of a sheet material incorporating a fourth form of the invention.

FIGS. 7 and 8 illustrate an alternative use for the first form of the invention.

Figure 1:
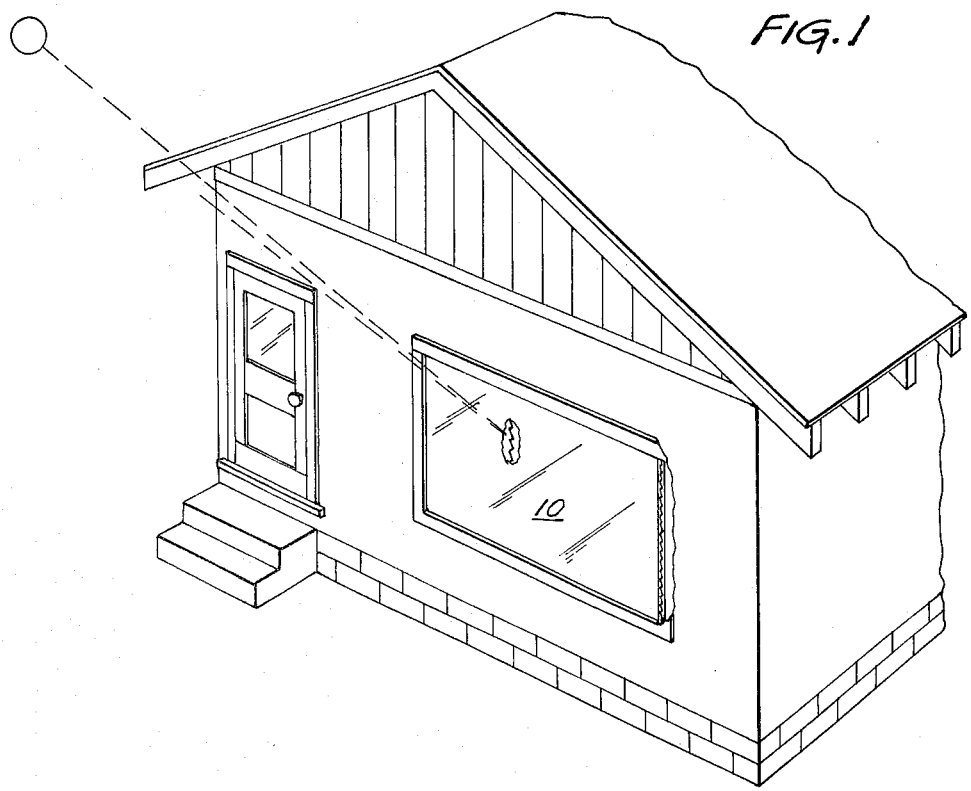
FIG. 1 illustrates a window comprising one form of the present invention shown in operative position and with segments broken away to demonstrate the function thereof.
Figure 2:
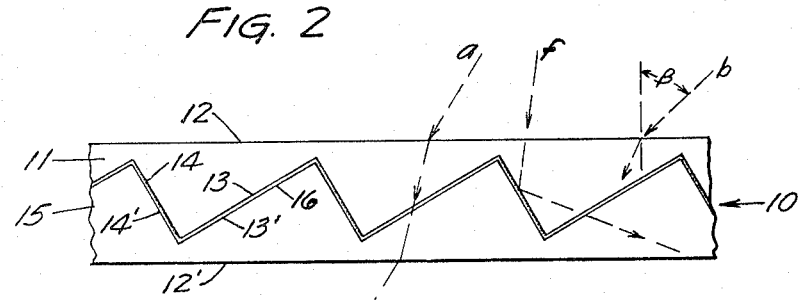
FIG. 2 is an edge view of a portion of a sheet material incorporating the form of the invention illustrated in FIG. 1.

Referring to FIGS. 1 and 2, a sheet material 10 is constructed of an outer layer 11 which has a flat surface 12 on one side and alternating first prism faces 13 and second prism faces 14 on the other side; and a matching layer 15, having a flat surface 12' on one side parallel to flat surface 12, and alternating first prism faces 13' and second prism faces 14' on the other side that are interfitted with the first and second prism faces of layer 11. The second prism faces 14 are provided with a 100% specular reflective coating. The first prism faces 13 are spaced from the interfitting prism faces 13' and the spacing is occupied by a medium 16 having an index of refraction lower than the index of refraction of the substance of layer 11.

The substance of layer 15 has the same index of refraction as the substance of layer 11. Thus, the light rays that are permitted to pass through layer 11 will exit from the sheet material through surface 12' in the same direction at which they originally struck the sheet. For example, note the path of ray (a), which is refracted into the layer 11, passes through prism faces 13 and 13' into plate 15, and exits through surface 12' where it is again refracted exactly reverse to the refraction of surface 12 to thereby resume its original direction of travel. This permits the viewing of images through the sheet with a minimum of distortion.

The angle α (alpha) between surface 12 and prism faces 13 is established by first selecting an angle β (beta) as the maximum angle of incidence at which it is desired that a ray (b) be permitted to pass through the window. Then the angle of refraction λ (lambda) is determined by the formula $\frac{\sine \beta}{\sine \lambda} = \frac{\text{index of refraction of layer substance}}{\text{index of refraction of medium 16}}$ The critical angle of incidence is then determined by the formula $\sine \theta_c = \frac{\text{index of refraction of medium 16}}{\text{index of refraction of layer substance}}$. Angle α is established as the difference between $\theta_c$ and λ or $\alpha = \theta_c - \lambda$.

As mentioned above, the angle of refraction of the ray (b) is λ and represents one of the angular limits that the unwanted rays can initially assume within the outer layer. The other limit is established by the refraction of ray (c) which has a 90° angle of incidence to surface 12. As explained previously, this ray has to assume an angle of refraction within layer 11 equal to the critical angle of incidence determined by the indices of refraction of the substance of the layer and the medium adjacent surface 12. Referring to this critical angle as $\theta_c'$, it will be seen that the angular range R within which rays striking the sheet beyond angle β can assume within the outer layer 11 is equal to $\theta_c' - \lambda$. It follows that when these rays initially strike prism faces 13, the angular range thereof has $\theta_c$ as one limitation and $\theta_c + R$ as the other limitation. Hereafter the angle of incidence of any ray that initially strikes side 13 within this angular zone is referred to as the initial incident angle of reflection designated by the symbol E.

It will be recalled that as the rays are reflected back and forth between prism faces 13 and surface 12, each reflection causes an increase in the succeeding angle of incidence. The increase is exactly the same for each reflection and is equal to the angle between the prism faces 13 and surface 12, i.e., angle α. Therefore, the angle of incidence each time the rays strike prism faces 13 is equal to E plus an even multiple of α (zero inclusive), and each time the rays strike surface 12, the angle of incidence is equal to E plus α plus an even multiple of α (zero inclusive).

Prism faces 14 are disposed at an angle to prism faces 13 equal to 90° plus any multiple of angle α, zero inclusive. Thus, the rays that are reflected from surface 12 toward prism faces 14 and are then specularly reflected toward prism faces 13, will have an incident angle with said prism faces 13 equal to E plus an odd multiple of α (previous angle of incidence with surface 12) plus α (caused by the angle between surface 12 and prism faces 13) plus twice whatever multiple of α that the angle between prism faces 13 and 14 exceeds 90° (caused by the angle of prism faces 14). It will thus be seen that the rays are again directed toward prism faces 13 at an angle equal to E plus an even multiple of α but they are now directed toward the apex of the angle between surface 12 and prism faces 13. The rays that are reflected from prism faces 13 toward prism faces 14, and are then specularly reflected toward surface 12, will have an incident angle with said surface 12 equal to E plus an even multiple of α (previous angle of incidence with prism faces 13) minus α (caused by the angle of incidence between surface 12 and prism faces 13) minus twice whatever multiple of α that the angle between prism faces 13 and 14 exceeds 90° (caused by the angle of the reflecting surface on prism faces 14). It will thus be seen that these rays are directed toward surface 12 at an angle equal to E plus an odd multiple of α but are also now directed toward the apex of the angle between surface 12 and prism faces 13.

Therefore, in either of the above cases, as the rays are reflected back and forth between surface 12 and prism faces 13, with each reflection the angle of incidence is reduced by exactly the amount of angle α. This reduction continues until the angle of incidence of the rays upon striking surface 12 is equal to $E - \alpha$. The maximum angle that $E - \alpha$ can assume is $\theta_c + R - \alpha$. It will be recalled that $\alpha = \theta_c - \lambda$ and also that $R = \theta_c' - \lambda$. It follows that $\lambda = \theta_c - \alpha = \theta_c' - R$ and therefore $\theta_c' = \theta_c + R - \alpha$. Thus the maximum angle that $E - \alpha$ can assume is $\theta_c'$ and therefore when the rays strike surface 12 with an incident angle equal to $E - \alpha$, they will pass through that interface and escape the sheet material through the same side as they entered. It will be further noted that the rays will leave the sheet with an angle of refraction exactly equal to the angle of incidence that said same rays had when they initially struck the sheet.

Figure 2A:
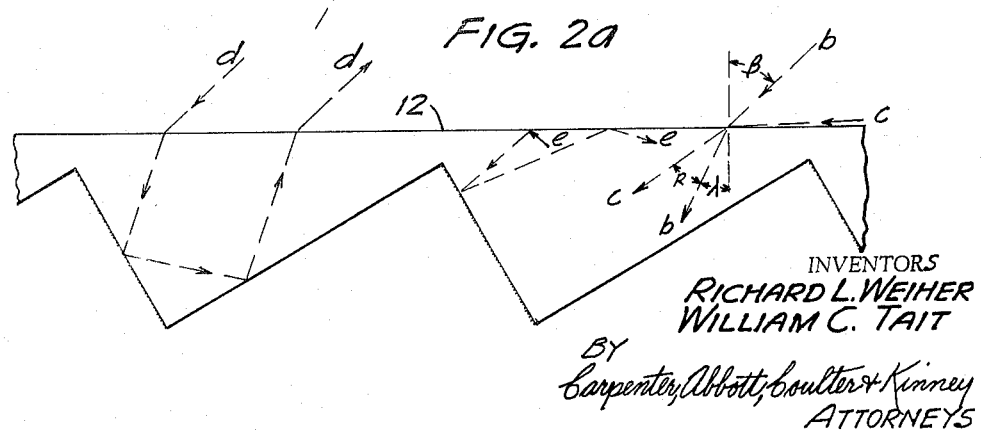
FIG. 2a is an edge view of a portion of a layer of a sheet material incorporating the first form of the invention.

As will be seen in FIG. 2a, a portion of the unwanted rays will follow a path whereby they will be refracted into layer 11 and then immediately directed toward prism faces 14, e.g., see path of ray (d). The angle of refraction of such rays is equal to $E - \alpha$, which upon being specularly reflected by prism faces 14 toward prism faces 13, is altered to the extent of adding α plus twice the multiple of α by which the angle between prism faces 13 and 14 exceeds 90°, and consequently said rays will be reflected toward prism faces 14 with an incident angle at least equal to E. Such rays are then reflected toward surface 12 in the direction of the apex between surface 12 and prism faces 14, and therefore the ray will escape the prism in the same manner as explained above.

It will also be seen from FIG. 2a that portions of the unwanted rays may follow a path whereby they are reflected off of surface 12 toward prism faces 14 and then reflected back to surface 12, e.g., see path of ray (e). Such rays will not be governed by the above conditions and therefore may escape the layer 11 through prism faces 13. The percentage of rays that escape this way is relatively small and therefore is not considered material for a great many of the applications of the invention. However, in those cases where it is important to prevent such escape of the unwanted rays, the angle β and the substance of the layers should be selected so that the angle between surface 12 and prism faces 14 is equal to the critical angle at prism faces 13 plus or minus any multiple of angle α (zero inclusive) plus one-half the angular range R.

It will be understood that the reflective coating on prism faces 14 will interfere with certain light rays that strike the sheet material within angle β, e.g., see path of ray (f) in FIG. 2. Where such interference is undesirable, the second form of the invention illustrated in FIGS. 3 and 4 may be employed. Referring to said second form, surface 17 and prism faces 18 are disposed in the same manner as surface 12 and prism faces 13 of the first form. Prism faces 19 are disposed at an angle α' to surface 17 equal to α, and a medium 20 having an index of refraction less than that of the substance of the layer is adjacent both prism faces 18 and 19. Thus, the unwanted rays that are reflected by prism faces 18 toward surface 17 and then to prism faces 19 (e.g., see ray (g) in FIG. 3) will continue to travel toward the juncture between surface 17 and prism faces 19. The rays will reflect back and forth between the faces, losing a portion of the incident angle equal to α' with each reflection. As the angle of incidence of the ray with surface 17 before striking prism faces 19 is equal to E plus α plus an even multiple of α, and in that α' is equal to α, the ray will necessarily strike prism faces 18 with an angle of incidence equal to E plus an even multiple of α′ and the rays will escape the sheet through surface 17.

The percentage of rays that will be reflected from prism faces 18 toward prism faces 19 without first striking surface 17 is small, e.g., see ray (h) of FIG. 3. This is particularly true if α is quite small. Thus in many applications, the fact that some of the unwanted rays that follow this path may escape the prism through prism faces 18 and 19 is not considered material. However, in those cases where such escape of the rays is deemed material, angle β and the medium of the layers should be chosen so that the angle ϕ between prism faces 18 and 19 satisfies the following conditions:

ϕ must greater than $90° + \theta_c$ so that all rays reflected off prism faces 18 toward prism faces 19 will have an incident angle with prism faces 19 greater than the critical angle at prism faces 19.

ϕ must be equal to $2\theta_c$ plus R plus or minus any even multiple of α. This will permit the angle of incidence of such rays with prism faces 19 to assume an angle of E′ plus an even multiple of α′ where E′ is equal to $\theta_c$ plus R minus any fraction of R. In that E′ satisfies the condition of being within the range having $\theta_c$ as one limit and $\theta_c + R$ as the other limit, the ray must necessarily escape the sheet material through surface 17.

Prism faces 19 are not coated and therefore a material portion of the unwanted rays will escape the outer layer 11′ through the prism faces 19 thereof, e.g., see path of ray (j). As will be seen from FIG. 4, in this form of the invention, multiple layers similar to layer 11′ are superimposed over one another and arranged so that in effect prism faces 18 are extended so that any ray (k) that enters the outer surface 17 will eventually strike the prism faces 18 of one of the successive layers. Upon striking the prism faces 18 of one of the layers, the ray (k) follows a path within that layer the same as if the ray had initially struck prism faces 18 of the outer layer 11′. It will be noted that in this form of the invention, by establishing angle β as the maximum angle at which rays can pass through the sheet from one side thereof, because prism faces 18 and 19 are disposed exactly opposite to one another, an angle β′ is established exactly equal to angle β beyond which light rays coming from the other side of the normal will be restricted in the same manner as explained above.

As pointed out, the first form of the invention may be somewhat objectionable due to the interference by the specular reflective coating on the second prism faces of certain wanted light rays. It will be understood that generally where windows are concerned, this interference can be reduced to a minimum if the second prism faces are disposed perpendicular to the flat surface. However, then the unwanted rays that strike prism faces 14 directly will be reflected toward prism faces 13 with an incident angle equal to $E - 2\alpha$ and will thus escape the outer layer through that side. The third form of the invention satisfies this condition as follows:

Referring to FIG. 5, flat surface 22 and prism faces 23 of outer layer 21 are disposed in the same manner as flat surface 12 and prism faces 13 of the outer layer 11 of the first form of the invention. Prism faces 24 are coated with a specular reflective material and disposed perpendicular to the flat surface 22. A second layer 25, similar to layer 21, comprises a flat surface 26 and a series of prism faces 27 and 28 that are interfitted with prism faces 23 and 24. A third layer 35 is also similar to outer layer 21 and has a flat surface 36 and prism faces 37 and 38. Said third layer 35 is disposed relative to outer layer 21 with angle α directed opposite to angle α of layer 21, and prism faces 38 are coated with a specular reflective material and are aligned with prism faces 24. A fourth layer 39 likewise similar to outer layer 21 has a flat surface 40 and a series of prism faces 41 and 42 that are interfitted with prism faces 37 and 38 of layer 35. Said surface 40 comprises the outer surface of the sheet material opposite and parallel to outer surface 22 of layer 21. The substance of each layer has the same index of refraction, and spacings are maintained at the interfaces between prism faces 23 and 27, between flat surfaces 26 and 36, and between prism faces 37 and 41. Said spacings are occupied by a medium having a lower index of refraction than that of the substance of the layers.

Therefore a ray that is reflected off prism faces 24 and strikes prism faces 23 with an incident angle equal to $E - 2\alpha$ will pass through prism faces 23, through layer 25 and into layer 35, where it will strike side 37 with an incident angle equal to E. The pattern of the ray will be exactly the same within layer 35 as a ray striking prism faces 23 at an incident angle equal to E within layer 21. Thus the incident angle will increase with each reflection by angle α until it is reflected off of side 38 and headed back toward the apex between surface 36 and prism faces 37. The incident angle then decreases until it becomes less than E, which necessarily occurs only when striking surface 36, for the same reasons discussed heretofore. The ray will then continue back through layers 25 and 21 and escape the window through flat surface 22 (see path of ray (m)).

It will be noted that a small percentage of the unwanted rays will be reflected off of prism faces 23 toward prism faces 24 and back to prism faces 23, e.g., see path of ray (n). In those situations where it is deemed material to control such rays, angle β and the medium of the outer layer should be selected so that the angle between prism faces 23 and 24 is equal to $\theta_c$ plus $R/2$ plus any multiple of α.

A fourth form of the invention is illustrated in FIG. 6. Again flat surface 30 and prism faces 31 of outer layer 29 are disposed in the same manner as surface 12 and prism faces 13 of the first form of the invention. Prism faces 32 are coated with a specular reflecting material and disposed at an angle K (kappa) with surface 30 which is less than $$\frac{\theta_c + \theta_c' - \alpha}{2}$$

With this condition satisfied, the unwanted rays that enter the layer 29 and subsequently strike side 32 will be reflected toward surface 30 with an incident angle less than the critical angle at surface 30, i.e., $\theta_c'$, or will be directed toward the apex of the angle between surface 30 and prism faces 32. As the rays cannot pass through prism faces 32, they will be reflected back and forth, losing a portion of their incident angle with each reflection until they are reduced to less than $\theta_c'$. They will then pass through surface 30 and escape the sheet. Layer 33 minimizes distortion and provides a gap 34 in the same manner as layer 15 of the first form of the invention.

Although preferred embodiments of the invention have been described herein, it will be understood that many modifications and applications can be made of the invention without departing from the scope thereof. A few examples of such modifications and applications are set forth in the following paragraphs.

The gaps adjacent the prism faces may be occupied by any number of substances as long as the index of refraction is less than the index of refraction of the layer substance. It is further pointed out that with every change of the medium in the gap, the critical angle at the prism faces is changed. Thus, whereas α is a fixed value for any particular sheet, and because $\alpha = \theta_c - \lambda$, each time that the critical angle is changed the angle of refraction is changed and accordingly the angle β is changed. Therefore, it is conceivable that it may be desirable to alter the angle of incidence which determines the zone of unwanted rays, i.e. β, by changing the medium in the gap to one having a higher or lower index of refraction.

Furthermore, it may be desirable to coat the sheet material with a protective plastic or even a translucent material such as frequently employed in windows of factories and the like. Where such plastic or translucent material has a different index of refraction than the substance of the outer layer, the light rays will go through a double refraction before entering said outer layer. However, such does not affect the functioning of the invention, for $\beta$ will merely be selected at the outer surface of the plastic and $\lambda$ will remain as the angle of refraction within the outer layer. It is, however, believed probable that most of the applications of the invention will utilize air as both the medium adjacent the flat surface and the medium within the gap. In such event $\theta_c'$ will equal $\theta_c$, and R will equal $\alpha$, and, accordingly, such symbols may be interchanged with respect to all of the above mentioned conditions.

Although the description of the invention has been primarily in connection with the application thereof for windows, it is pointed out that the invention has a great deal of utility in other fields. Thus, in the first form of the invention it is noted that substantially all of the unwanted light rays are directed back out through the sheet in exactly the direction from which the rays initially struck the sheet. Therefore, one conceivable use of the invention is for center lines on highways where the light beam from an automobile will strike the sheet material at a predetermined distance ahead of the car and be reflected back to the driver. It will be noted that in this application prism faces 13 can also be coated, in that it is not necessary that any light be transmitted through the sheet material. See the illustration thereof in FIGS. 7 and 8. Also, the sheet material may be used in television sets to block off disturbing light rays angularly directed at the picture tube, or it may be incorporated as an automobile visor which may be positioned to shield the driver's eyes from the sun or direct glare from the headlights of oncoming cars.

It will be further understood that a variety of advantages are enjoyed by use of the invention in the different applications. It is pointed out, however, that a somewhat phenomenal effect, not readily foreseeable, results when the invention is incorporated in a window. That is, a person standing at a distance from a large window incorporating the present invention will observe that the area within which light is prevented from passing through the window forms an arc across the window. Thus, if the window faces south, when the sun first rises in the east, the direct sun rays will strike the low point of the arc at the left side of the window. As the sun moves across the window, it rises and, accordingly, the arc moves higher up on the window to permit maximum viewing but still preventing penetration of the direct rays of the sun. As the sun sinks in the west, the rays strike the right side of the arc and again are prevented from penetrating the windows.

In general, this phenomenon is explained as follows:

The critical angle at the interface between two media establishes within the medium having the higher index of refraction a zone beyond which a ray striking the interface with an incident angle greater than the critical angle will be rejected by the interface, regardless of what direction the ray is coming from. Thus, the rays that pass through a window and strike the eye of an observer will all travel through the window within a restricted zone which assumes a frusto-conical shape within the window. This frusto-conical shape will not be observed if all of the faces of the window are parallel by reason of the laws of light refraction. However, by establishing within the window an interface at an angle to the outer surface of the window, such as the herein first prism faces, the frusto-conical zone is tilted to correspond with the angle of said interface. It is the tilting of the frusto-conical zone that permits exclusion of the rays striking the window beyond the angle $\beta$, and it is the shape of the conical zone that provides the mentioned arcing effect. As explained above, a predetermined angle $\beta$ may be established by making the sheet material of any of a number of substances having various indices of refraction. If the substance has a high index of refraction, angle $\alpha$ will be relatively small; whereas if the substance has a low index of refraction, angle $\alpha$ will be relatively large. In that angle $\alpha$ determines the angle of the first prism faces, it will be understood then that with the substance having a low index of refraction, the frusto-conical zone is tilted much more than the frusto-conical zone of the material having a high index of refraction to achieve the same angle $\beta$. It follows that the conical arc of the substance having the lower index of refraction is much flatter for the same angle $\beta$ across the same area of window. Thus, it will be seen that a window incorporating the present invention can include numerous variations. The arcing effect can be increased or decreased in accordance with the index of refraction of the various substances used, and by rotating the angle $\alpha$ either clockwise or counterclockwise, the arcing can be made to drop off more on one side than the other, to adapt to situations where the arcing effect may be desired on one side but not the other.

Applicant also wishes to point out that the invention may be practiced without establishing the precise angular conditions that have been set forth herein. That is, these angles and their relationship to one another having once been learned may be slightly varied to achieve substantially the same results but with slightly reduced effectiveness. It will therefore be understood that such slight variation is within the scope of the invention.

What is claimed is:

1. A sheet material for controlling light transmittance comprising a layer of light transmitting substance having a flat surface on one side and a series of alternating first and second prism faces on the other side, a medium adjacent said first prism faces having an index of refraction less than the index of refraction of said substance, said first prism faces at an angle to the flat surface equal to the difference between the critical angle of incidence at the first prism faces and the angle of refraction at said flat surface of a ray striking said sheet material at a predetermined angle of incidence beyond which it is desired to prevent light rays from passing through the sheet material and said second prism faces comprising means that repels substantially all of said light rays upon their striking said second prism faces and to cause said repelled rays to leave said layer through said flat surface.

2. Sheet material as defined in claim 1 wherein said second prism faces are disposed so that the repelled rays that thereafter strike the first prism faces have incident angles with said first prism faces substantially equal to the incident angles said same rays had when they initially struck said first prism faces plus any even multiple, zero inclusive, of the angle between said flat surface and the first prism faces.

3. Sheet material as defined in claim 2 including a second layer of the same substance as the first layer, said second layer having one side comprising first and second prism faces that are interfitted with the prism faces of the first layer, and the other side of said second layer having a flat surface that is parallel with the flat surface of said first layer.

4. A sheet material for controlling light transmittance comprising a layer of light transmitting substance having a flat surface on one side and a series of alternating first and second prism faces on the other side, a medium adjacent said first prism faces having an index of refraction less than the index of refraction of said substance, said first prism faces at an angle to the flat surface equal to the difference between the critical angle of incidence at the first prism faces and the angle of refraction at said flat surface of a ray striking said sheet material at a predetermined angle of incidence beyond which it is desired to prevent light rays from passing through the sheet material, said second prism faces comprising a specular reflective coating and disposed at an angle to said first prism faces substantially equal to 90° plus any multiple, zero inclusive, of the angle between said first prism faces and the flat surface.

5. Sheet material for controlling light transmittance as defined in claim 4 wherein the angle between the second prism faces and the flat surface is substantially equal to said critical angle of incidence plus one-half of the angular range of the refracted rays striking the sheet beyond the predetermined angle of incidence, plus any multiple, zero and minus values included, of the angle between the first prism faces and the flat surface.

6. A sheet material for controlling light transmittance comprising a layer of light transmitting substance having a flat surface on one side and a series of alternating first and second prism faces on the other side, a medium adjacent said first prism faces having an index of refraction less than the index of refraction of said substance, said first prism faces at an angle to the flat surface equal to the difference between the critical angle of incidence at the first prism faces and the angle of refraction at said surface of a ray striking said sheet material at a predetermined angle of incidence beyond which it is desired to prevent light rays from passing through the sheet material, said second prism faces at an angle to said flat surface equal to the angle between the first prism faces and the flat surface.

7. Sheet material for controlling light transmittance as defined in claim 6 wherein the angle between the first and second prism faces is substantially equal to twice the critical angle plus the angular range of the refracted rays striking the sheet beyond the predetermined angle of incidence, plus any even multiple, zero and minus values included, of the angle between the first prism faces and the flat surface, and said angle between the first and second prism faces being at least as large as 90° plus the critical angle.

8. Sheet material for controlling light transmittance as defined in claim 6 including a plurality of superimposed layers of the same substance as said first layer, each of said plurality of layers having a flat surface on one side parallel with the flat surface of said first layer, and alternating first and second prism faces on the other side respectively parallel with the first and second prism faces of said first layer, the first prism faces of the first layer in alignment with the first prism faces of the respective plurality of layers so that the rays that strike the sheet beyond the predetermined angle of incidence and thereafter pass directly through the second prism faces of said first layer will strike one of the first prism faces of a succeeding layer.

9. A sheet material for controlling light transmittance comprising a layer of light transmitting substance having a flat surface on one side and a series of alternating first and second prism faces on the other side, a medium adjacent said first prism faces having an index of refraction less than the index of refraction of said substance, said first prism faces at an angle to the flat surface equal to the difference between the critical angle of incidence at the first prism faces and the angle of refraction at said surface of a ray striking said sheet material at a predetermined angle of incidence beyond which it is desired to prevent light rays from passing through the sheet material, said second prism faces comprising a specular reflecting surface and disposed at an angle to said flat surface no greater than one-half the critical angle at said first prism faces, plus one-half the critical angle at said flat surface, minus one-half the angle between the first prism faces and the flat surface.

10. A sheet material for controlling light transmittance comprising a layer of light transmitting substance having a flat surface on one side and a series of alternating first and second prism faces on the other side, a medium adjacent said first prism faces having an index of refraction less than the index of refraction of said substance, said first prism faces at an angle to the flat surface equal to the difference between the critical angle of incidence at the first prism faces and the angle of refraction at said surface of a ray striking said sheet material at a predetermined angle of incidence beyond which it is desired to prevent light rays from passing through the sheet material, said second prism faces having a specular reflective coating and disposed perpendicular to the flat surface, a second layer comprising a series of prism faces interfitted with the first and second prism faces of the first layer, a third layer having a flat surface on one side and first and second prism faces on the other side relative to one another as the flat surface and first and second prism faces of the first layer, said third layer positioned relative to the first layer with the diverging angle between the flat surface and the first prism faces of the third layer directed oppositely to the diverging angle between the flat surface and first prism faces of the first layer and with the second prism faces of the third layer coated with a specular reflective material and aligned with the second prism faces of the first layer, and a fourth layer having an outer flat surface parallel to the flat surface of the first layer and prism faces on the inner side interfitted with the first and second prism faces of the third layer.

No references cited.

JULIA E. COINER, *Primary Examiner.*